(12) United States Patent  
Dake (10) Patent No.: US 8,151,033 B2  
(45) Date of Patent: Apr. 3, 2012

(54) MECHANISM FOR VIRTUAL LOGICAL VOLUME MANAGEMENT

(75) Inventor: Steven Dake, Flagstaff, AZ (US)

(73) Assignee: Red Hat, Inc., Raleigh, NC (US)

( * ) Notice: Subject to any disclaimer, the term of this patent is extended or adjusted under 35 U.S.C. 154(b) by 391 days.

(21) Appl. No.: 12/473,854

(22) Filed: May 28, 2009

(65) Prior Publication Data

US 2010/0306445 A1    Dec. 2, 2010

(51) Int. Cl.  
*G06F 12/00* (2006.01)

(52) U.S. Cl. .................. 711/6; 711/112; 711/E12.001; 711/E12.016; 718/1

(58) Field of Classification Search ............. 711/6, 112, 711/E12.001, E12.016; 718/1  
See application file for complete search history.

(56) References Cited

U.S. PATENT DOCUMENTS

| | | | |
|---|---|---|---|
| 2003/0061220 A1* | 3/2003 | Ibrahim et al. | 707/10 |
| 2007/0106870 A1* | 5/2007 | Bonwick et al. | 711/170 |
| 2010/0241726 A1* | 9/2010 | Wu | 709/217 |

* cited by examiner

*Primary Examiner* — Hoai V Ho  
(74) *Attorney, Agent, or Firm* — Lowenstein Sandler PC (57) ABSTRACT

In one embodiment, a mechanism for virtual logical volume management is disclosed. In one embodiment, a method for virtual logical volume management includes writing, by a virtual machine (VM) host server computing device, a control block to each of a plurality of network-capable physical storage devices and mapping, by the VM host server computing device, physical storage blocks of the plurality of network-capable physical storage devices to virtual storage blocks of a virtual storage pool by associating the physical storage blocks with the virtual storage blocks in the control block of the network-capable physical storage device housing the physical storage blocks being mapped. Furthermore, the method includes assigning, by the VM host server computing device, a block range of the virtual storage blocks to a VM allocated by the VM host server computing device by writing a unique identifier (ID) of the VM to one or more entries in the control block having the physical storage blocks associated with the block range of the virtual storage blocks assigned to the VM.

20 Claims, 6 Drawing Sheets

Fig. 1

| Physical Storage Block ID 210 | Virtual Storage Pool Storage Block ID 220 | VM Mapping (VM Unique ID) 230 |
|---|---|---|
| 0 | 5000 | 1234 |
| 1 | 5001 | 1234 |
| 2 | 5002 | 1234 |
| 3 | 5003 | 1234 |
| 4 | 5004 | 1234 |
| 5 | 5005 | 1234 |
| ... | ... | ... |
| 500 | 5500 | 9876 |
| 501 | 5501 | 9876 |
| 502 | 5502 | 9876 |
| ... | ... | ... |
| 999 | 5999 | Free to Allocate |
| 1000 | 6000 | Free to Allocate |

```
Scan all control blocks on identified network-capable storage devices for unique
ID of the VM
                                                                              510
```

```
Map all identified storage blocks with unique ID of VM to local devmapper device
of host VM server, the local devmapper device serving as a host virtual disk for
the virtual storage pool of the VM host server
                                                                              520
```

```
For each VM, associate a disk of the host virtual disks to the VM
                                                                              530
```

```
Mount the host virtual disk associated with the VM being initialized to the VM to
serve as a block device of the VM
                                                                              540
```

MECHANISM FOR VIRTUAL LOGICAL VOLUME MANAGEMENT

TECHNICAL FIELD

The embodiments of the invention relate generally to storage area networks and, more specifically, relate to a mechanism for virtual logical volume management.

BACKGROUND

Data centers are usually composed of various Internet Small Computer System Interface (iSCSI) and FibreChannel storage devices, and also even direct attached storage. All of this storage may be from different manufacturers and may have different performance characteristics. Significantly, this storage is fragmented across the data center. As such, it is necessary to combine the multiple storage vendor disks into one large storage pool for ease of accessibility and management.

One current technique for storage pooling is by utilizing a storage gateway. The storage gateway is physical hardware that acts as a front end to the backend storage area network. However, a problem with storage gateways is that they introduce performance and latency issues because they become a central point of failure and a bottleneck. Another technique for storage pooling is logical volume management. Logical volume management has been applied to multiple systems to allow these multiple systems to share the same view of logical volumes available.

Currently, a trend is arising in data centers to run a virtual machine (VM) host server, which hosts VMs with corresponding guest Operating Systems. The host VM server is responsible for creating, destroying, and other management tasks of user-defined VMs that it hosts. The centralized hosting of VMs by the host VM server provides the manageability of sever server-based computing, while the dedicated environment provides the flexibility and compatibility with applications that a desktop enables. In general, VMs therefore enable remote access to a host or server computer by a remote client computer, which mimics or reconstructs the events taking place on the host computer.

Neither of the storage pooling techniques of storage gateways or logical volume management has been applied to mapping a specific grouping of disk blocks to one or more virtual machine block devices from a storage attached network (SAN) environment. As such, a mechanism to connect the fragmented storage across the data center onto a virtual machine guest would be beneficial.

BRIEF DESCRIPTION OF THE DRAWINGS

The invention will be understood more fully from the detailed description given below and from the accompanying drawings of various embodiments of the invention. The drawings, however, should not be taken to limit the invention to the specific embodiments, but are for explanation and understanding only.

DETAILED DESCRIPTION

Embodiments of the invention provide for a mechanism for virtual logical volume management. In one embodiment, a method of virtual logical volume management includes writing, by a virtual machine (VM) host server computing device, a control block to each of a plurality of network-capable physical storage devices and mapping, by the VM host server computing device, physical storage blocks of the plurality of network-capable physical storage devices to virtual storage blocks of a virtual storage pool by associating the physical storage blocks with the virtual storage blocks in the control block of the network-capable physical storage device housing the physical storage blocks being mapped. Furthermore, the method includes assigning, by the VM host server computing device, a block range of the virtual storage blocks to a VM allocated by the VM host server computing device by writing a unique identifier (ID) of the VM to one or more entries in the control block having the physical storage blocks associated with the block range of the virtual storage blocks assigned to the VM.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending", "receiving", "attaching", "forwarding", "caching", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (non-propagating electrical, optical, or acoustical signals), etc.

Embodiments of the invention provide a mechanism for virtual logical volume management. The mechanism of embodiments of the invention pools fragmented storage spread across a data network into a virtual storage block device that can be allocated with specific properties and attached to virtual machines (VMs). In this way, every VM has the ability to make a storage pooling decision and to collectively combine all of the data in the data network into one storage array that can then be allocated as chunks of data out into the file system.

Figure 1:
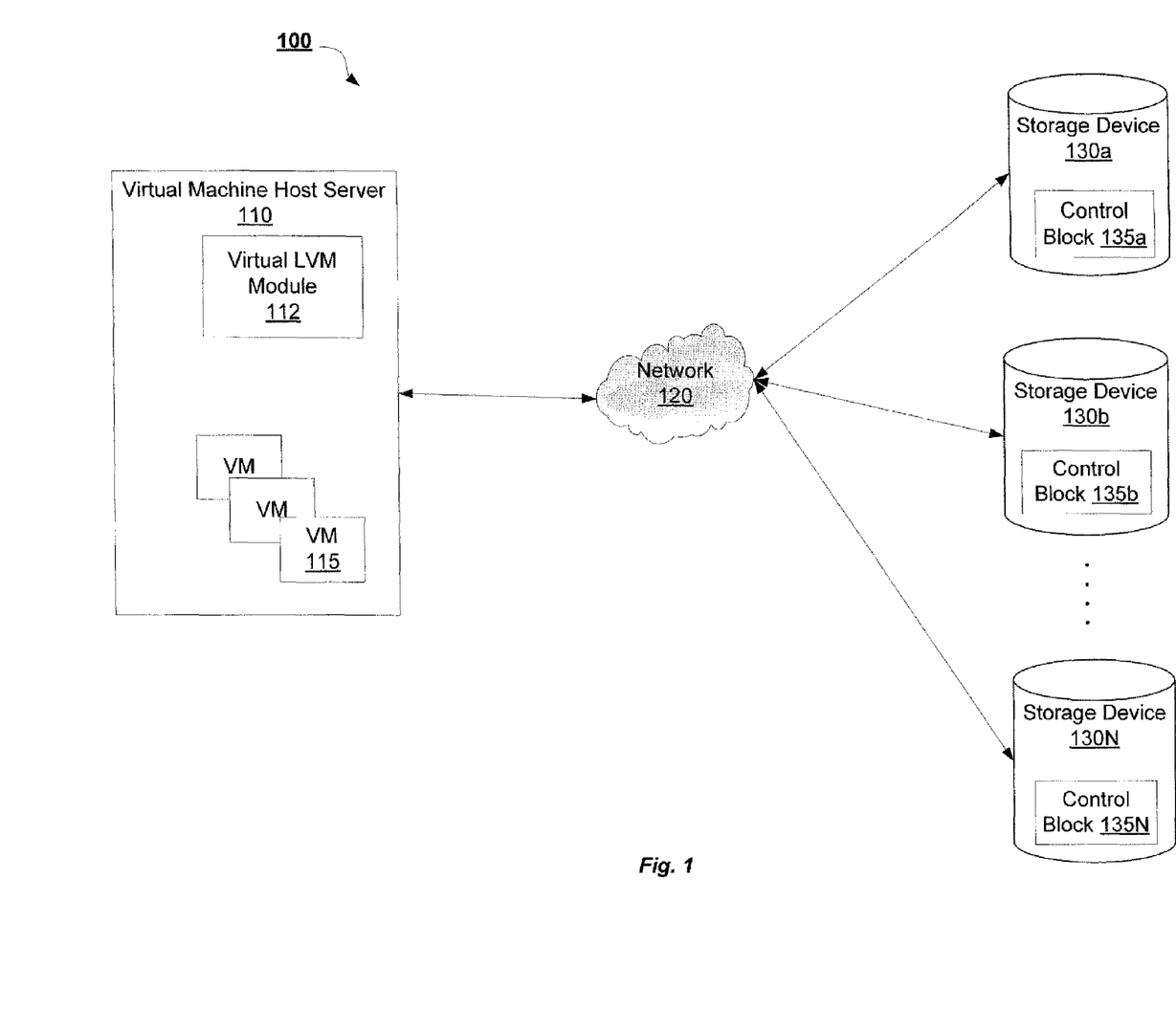
FIG. 1 is a block diagram of a virtual logical volume management system according to an embodiment of the invention.

FIG. 1 is a block diagram of a virtual logical volume management system 100 according to an embodiment of the invention. Virtual logical volume management system 100 includes a virtual machine (VM) host server 110 connected to one or more storage devices 130a-N via network 120. In one embodiment, storage devices 130a-130N are fragmented storage devices, such as iSCSI, FibreChannel, and/or any other type of network block devices, implemented as a data center.

In one embodiment, VM host server 110 is a computing device with a hardware platform including at least a processor and a memory. VM host server 110 hosts one or more VMs 115 that execute on top of a software layer that runs directly on the hardware platform of the VM host server 110. The VM host server's 110 physical resources are virtualized for the VMs 115 hosted by VM host server 110.

In one embodiment, VM host server 110 includes a virtual logical volume management (VLVM) module 112 to connect the fragmented storage devices 130a-N as a virtual storage pool that is then attached to VMs 115 by VM host server 110. In one embodiment, VLVM module 112 may be a mix of management application and libraries that provide the functionality for embodiments of the invention.

In one embodiment, VLVM module 112 connects fragmented storage devices 130a-N by first identifying all network-capable storage devices 130a-130N via network 120 and storing their information into its memory. Then, VLVM module 112 writes a control block 135a-135N onto each of the identified fragmented storage devices 130a-130N it locates. This control block 135a-135N contains information about how to map storage blocks of the physical storage devices 130a-130N to specific VMs 115 hosted by VM host server 110. In one embodiment, upon creation of the control blocks 135a-135N, each storage block entry in the control blocks 135a-135N is marked as "free for allocation."

In one embodiment, the VM host server 110 then allocates the one or more VMs 115 that are hosted by the VM host server 110. This allocation occurs before the VMs 115 are initialized by an end user (not shown) of the VM 115. Upon allocation of a VM 115, the VLVM module 112 accesses information about the entire "free for allocation" storage pool by scanning the control blocks 135a-135N that it has written. Then, the VLVM module 112 allocates a certain block size from the "free for allocation" storage pool and assigns it to one of the VMs 115. The VLVM module 112 repeats this process for each of the VMs 115 it allocates.

The storage block is assigned to the VM 115 by writing a unique identifier (ID) of the VM 115 into the control block(s) 135a-135N of the physical storage device(s) 130a-130N holding the storage blocks assigned to the VM 115. Most VMs 115 have a 128-byte UUID that can be used as the unique ID to write into the control block 135a-135N. However, other unique IDs may be used to represent the VM 115 in embodiments of the invention.

Figure 2:
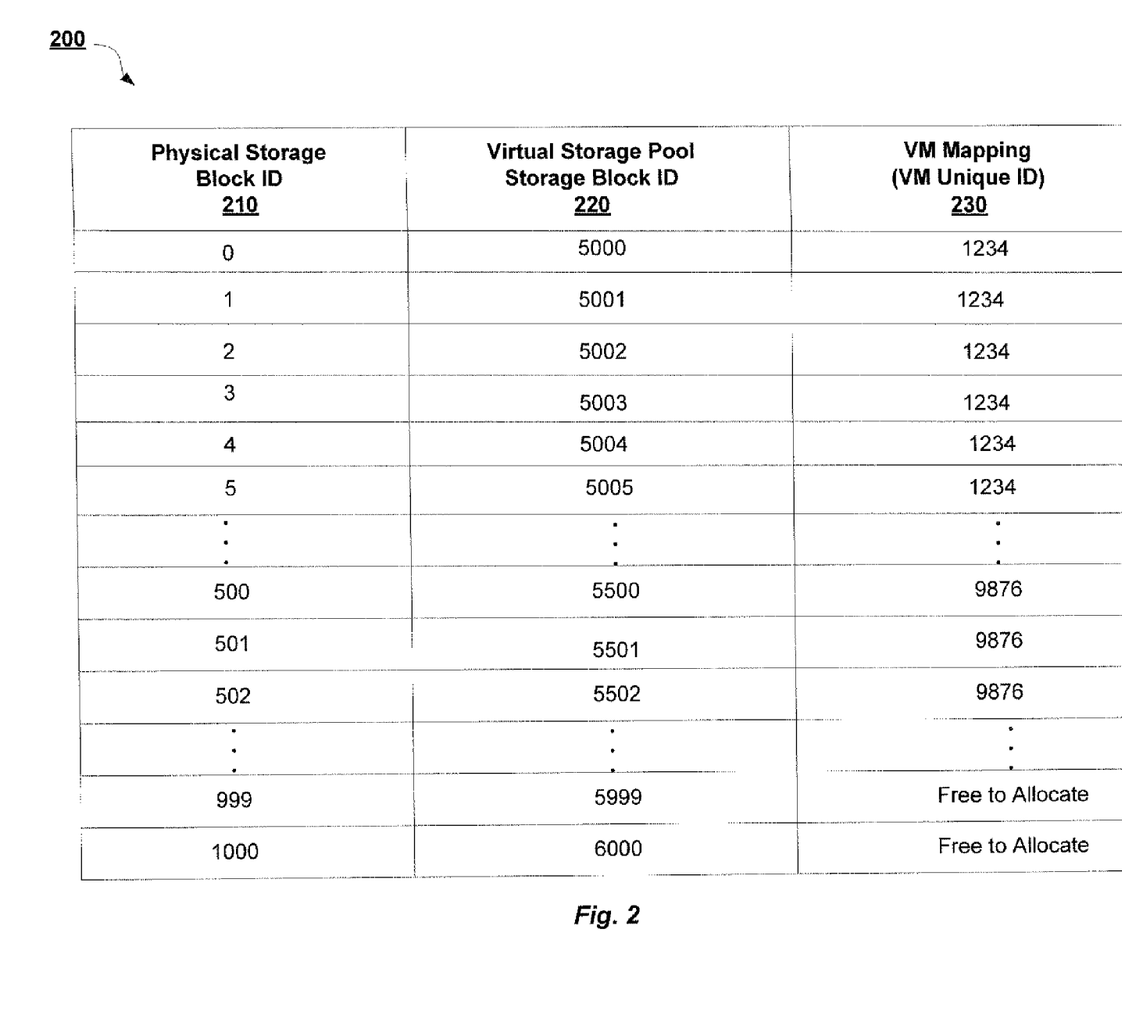
FIG. 2 is a block diagram of a control block according to an embodiment of the invention.

FIG. 2 is a block diagram of an exemplary control block 200 according to an embodiment of the invention. In one embodiment, control block 200 is the same as any of control blocks 135a-135N of FIG. 1. Control block 200 is written by a VLVM module to a fragmented physical storage device in order to connect the fragmented physical storage device to other fragmented storage devices in a way such that all of the fragmented storage devices appear as a virtual storage pool. This virtual storage pool is then allocated by a VM host server to one or more VMs hosted by the VM host server.

Control block 200 includes a physical storage block ID 210 identifying the actual physical storage blocks found within the physical storage device that control block 200 is written. Control block 200 further includes a virtual storage block ID 220 that identifies a virtual storage block in a virtual storage pool to which a physical storage block of the storage device (identified by a physical storage block ID 210) is mapped. Lastly, control block 200 includes a VM mapping 230. The VM mapping 230 identifies a unique ID of VM to which a physical storage block and its associated virtual storage block are assigned.

As particularly shown in FIG. 2, control block 200 illustrates that the physical storage device to which control block 200 is written to includes 1000 separate physical storage blocks identified with IDs 1 through 1000. Each of these physical storage blocks are mapped to a virtual storage pool—specifically to virtual storage blocks in the virtual storage pool identified with IDs 5000 to 6000. Furthermore, physical storage in the storage device and its associated virtual storage blocks have been assigned to two separate VMs, identified by unique VM IDs of 1234 and 9876. In addition, some physical storage in storage device remains "free for allocation" to other VMs.

It is important to note that control blocks of embodiments of the invention are not necessarily limited to the depiction of control block 200 provided in FIG. 2, and embodiments of the invention envision other formations of control block. Control block 200 is provided for illustrative purposes only and is not meant to be limiting to embodiments of the invention.

Figure 3:
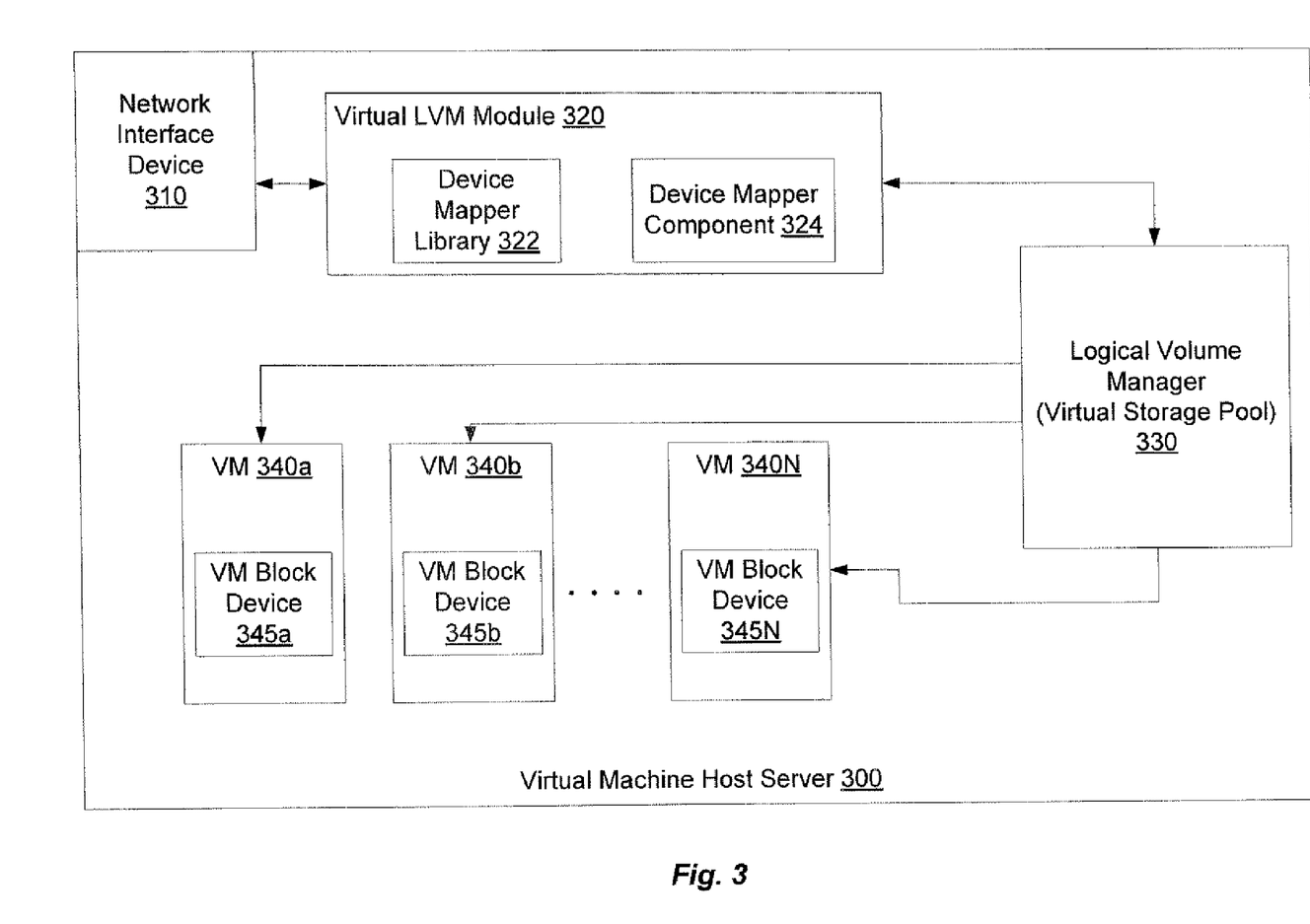
FIG. 3 is a block diagram of a virtual machine (VM) host server according to an embodiment of the invention.

FIG. 3 is a block diagram of a VM host server 300 according to an embodiment of the invention. In one embodiment, VM host server 300 is the same as VM host server 110 described with respect to FIG. 1. FIG. 3 illustrates in more detail the involvement of VM host server 300 in the virtual logical volume management of embodiments of the invention in terms of allocation and initialization of one or more VMs 340a-340N hosted by the VM host server 300.

In one embodiment, VM host server 300 includes a network interface device 310, a VLVM module 320, a logical volume manager 330, and a plurality of VMs 340a-340N. VM host server 300 utilizes the network interface device 310 to communicate with one or more physical storage devices (not shown) that are fragmented across a network and to be used as a virtual storage pool managed by logical volume manager 330 for VMs 340a-340N of VM host server 300.

Upon allocation of a VM 340a-340N by, for example, an administrator of the VM host server 300, the VLVM module 320 scans the all of the control blocks of the physical storage devices available in the network, such as control block 200 described with respect to FIG. 2. Once the entire "free for allocation" storage pool is identified, a storage block range to be assigned to a VM 340a-340N is selected. The unique ID of the VM 340a-340N is written to the control block(s) of the physical storage device(s) associated with the selected storage block range for the VM 340a-340N. In some embodiments, more than one VM 340a-340N may be able to access the storage assigned to a particular VM 340a-340N to support shared storage file systems, for example.

At this point, a local device mapper block device, namely a virtual disk from the virtual storage pool managed by logical volume manager 330, is specified as an associated block device to map to the physical storage block range assigned to the VM 340a-340N. In one embodiment, a device mapper component 324 of the VLVM module 320 uses a libdevmapper device mapper library 322 to create a mapping of the physical storage block range to the local device mapper block device of the VM host server 300.

The device mapper component 324 serves as a framework to map one block device onto another. Embodiments of the invention envision that any type of device mapper functionality of an operating system may be utilized and are not limited specifically to a devmapper using libdevmapper device mapper library.

More specifically, the device mapper component 324 takes the start and end address of a storage block on a physical storage block device and maps it to a start and end address in the virtual storage pool of the logical volume manager 330 of VM host server 300. The mapping by device mapper component 324 is accomplished by writing the start/end block number of the physical storage block to a start/end block number of the "virtual storage pool" into the control blocks of the various physical storage devices involved. In some embodiments, more than one start/end block can be written depending on algorithms used to allocate the storage pool. By controlling these mappings, the device mapper component 324 can dictate which VM 340a-340N gets access to what part of the shared virtual storage pool of logical volume manager 330 that is available to all VMs 340a-340N.

Subsequently, the VLVM module 320 then allocates the virtual storage pool of the logical volume manager 330 among the created VMs 340a-340N. For example, if the VM host server 300 has 20 virtual disks in its virtual storage pool managed by logical volume manager 330 that are lettered "a" through "t", then the VM host server 300 may assign each disk "a" through "t" to each of its 20 VMs. VM 340a may be assigned disk "a" as its VM block device 345a, VM 340b may be assigned disk "b" as its VM block device 345b, and so on.

In one embodiment, upon initialization of the VM 340a-340N by an end user (not shown) of the VM, the VM 340a-340N takes a parameter of the virtual block device, such as virtual disk "a", to mount. Then, the VM 340a-340N mounts that virtual disk as its individual VM block device 345a-345N to use as storage.

Figure 4:
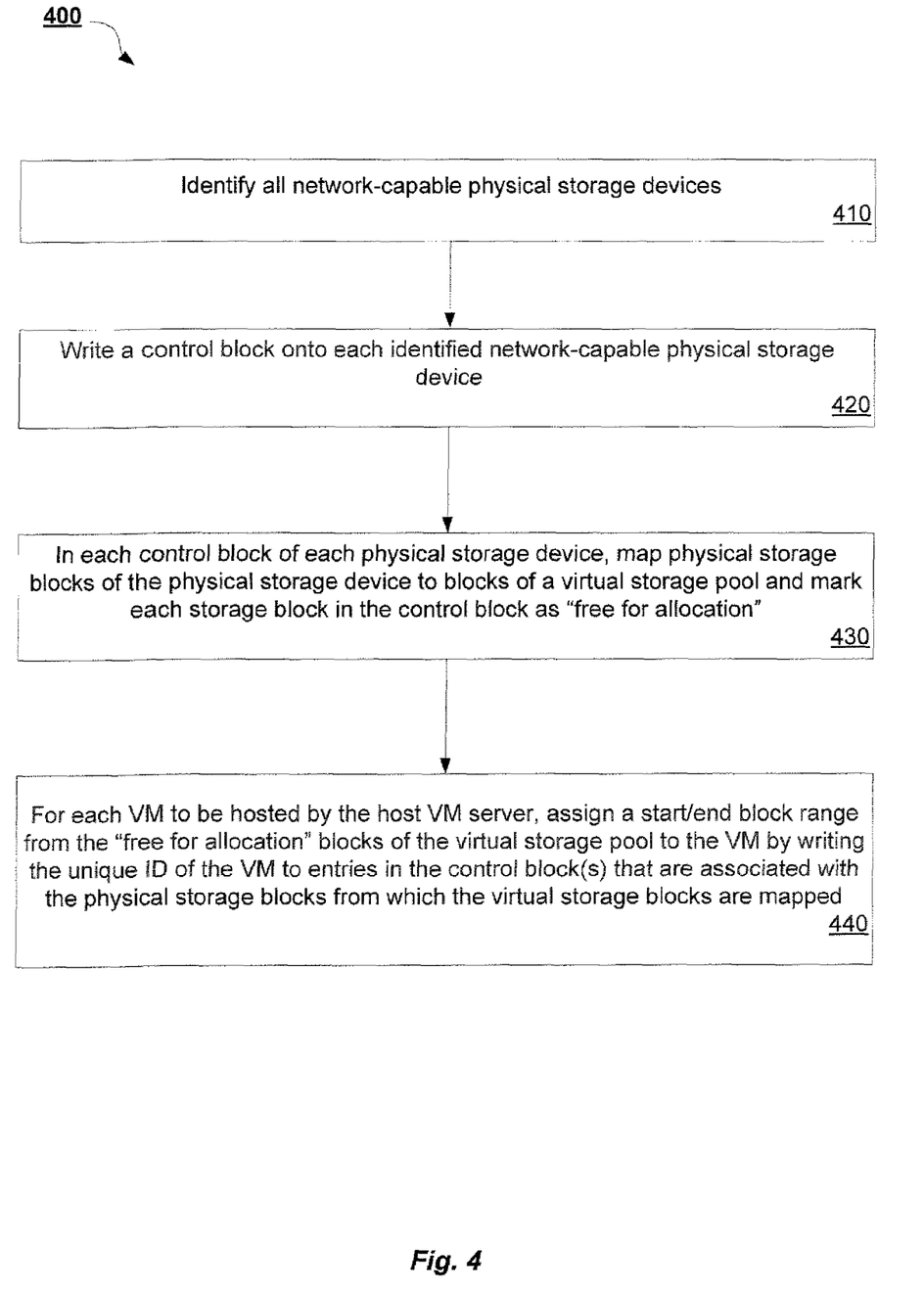
FIG. 4 is a flow diagram illustrating a method for the allocation of a VM by a VM host server using virtual logical volume management according to an embodiment of the invention.

FIG. 4 is a flow diagram illustrating a method 400 for the allocation of a VM by a VM host server using virtual logical volume management according to an embodiment of the invention. Method 400 may be performed by processing logic that may comprise hardware (e.g., circuitry, dedicated logic, programmable logic, microcode, etc.), software (such as instructions run on a processing device), or a combination thereof. In one embodiment, method 400 is performed by VM host server 300 of FIG. 3.

Method 400 begins at block 410 where all network-capable physical storage devices are identified. Then, at block 420, a control block is written onto each identified network-capable physical storage device. In one embodiment, this control block is the same as control block 200 described with respect to FIG. 2. At block 430, physical storage blocks of the identified physical storage devices are mapped to storage blocks of a virtual storage pool. This mapping is accomplished by writing the mapping information between the physical and virtual storage into the control block of the physical storage device. In addition, each storage block in the control block is marked as "free for allocation."

Subsequently, at block 440, for each VM hosted by the VM host server, a start/end block range is assigned from the "free for allocation" blocks of the virtual storage pool to the VM. This assignment is accomplished by writing the unique ID of the VM to the entries in the control block associated with the physical storage blocks that are mapped to the virtual storage blocks assigned to the VM. This assignment of virtual storage to a VM is done for each VM to be hosted by the VM host server. The assignment is also completed prior to any initialization of the VMs hosted by the VM host server.

Figure 5:
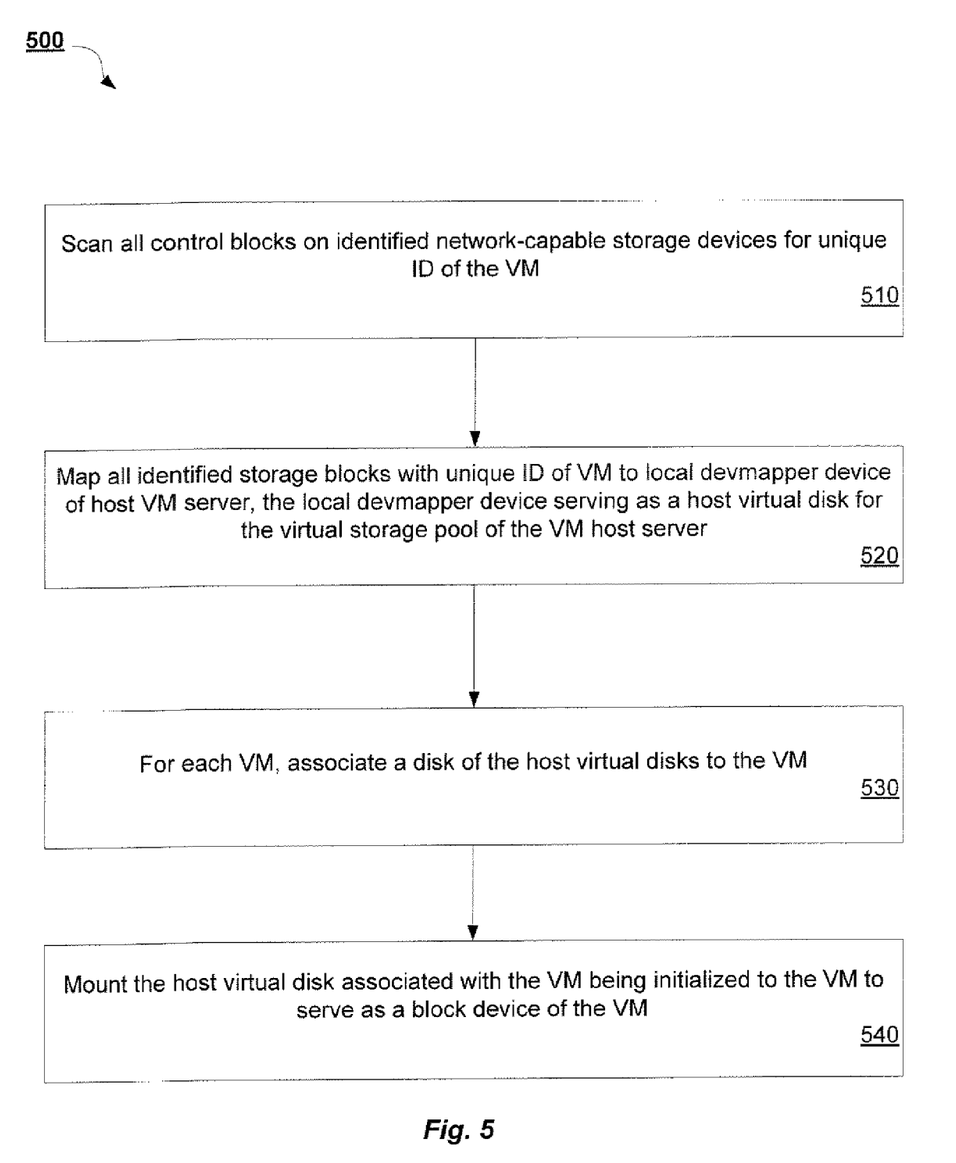
FIG. 5 is a flow diagram illustrating a method for the initialization of a VM by a VM host server using virtual logical volume management according to an embodiment of the invention.

FIG. 5 is a flow diagram illustrating a method 500 for the initialization of a VM by a VM host server using virtual logical volume management according to an embodiment of the invention. Method 500 may be performed by processing logic that may comprise hardware (e.g., circuitry, dedicated logic, programmable logic, microcode, etc.), software (such as instructions run on a processing device), or a combination thereof. In one embodiment, method 500 is performed by VM host server 300 of FIG. 3.

Method 500 begins at block 510 where control blocks on all identified network-capable storage device are scanned for the unique ID of a VM that is being initialized. In one embodiment, the control block is the same as control block 200 described with respect to FIG. 2. Then, at block 520, all identified storage blocks associated with the unique ID of the VM are mapped to a local devmapper device of the host VM server. This local devmapper device serves as the host virtual disk for the virtual storage pool of the VM host server. In some embodiments, any device mapper tool may be utilized to perform block 520.

Subsequently, at block 530, each disk of the host virtual disks is associated with a VM created by the VM host server. In one embodiment, this association occurs prior to the VM being initialized. In another embodiment, the association may be part of the VM initialization process. Lastly, at block 540, the host virtual disk associated with a VM being initialized is mounted to the VM being initialized as a block device. In this way, the physical storage associated with the mounted VM block device serves as the block device of the individual VM in embodiments of the invention.

Figure 6:
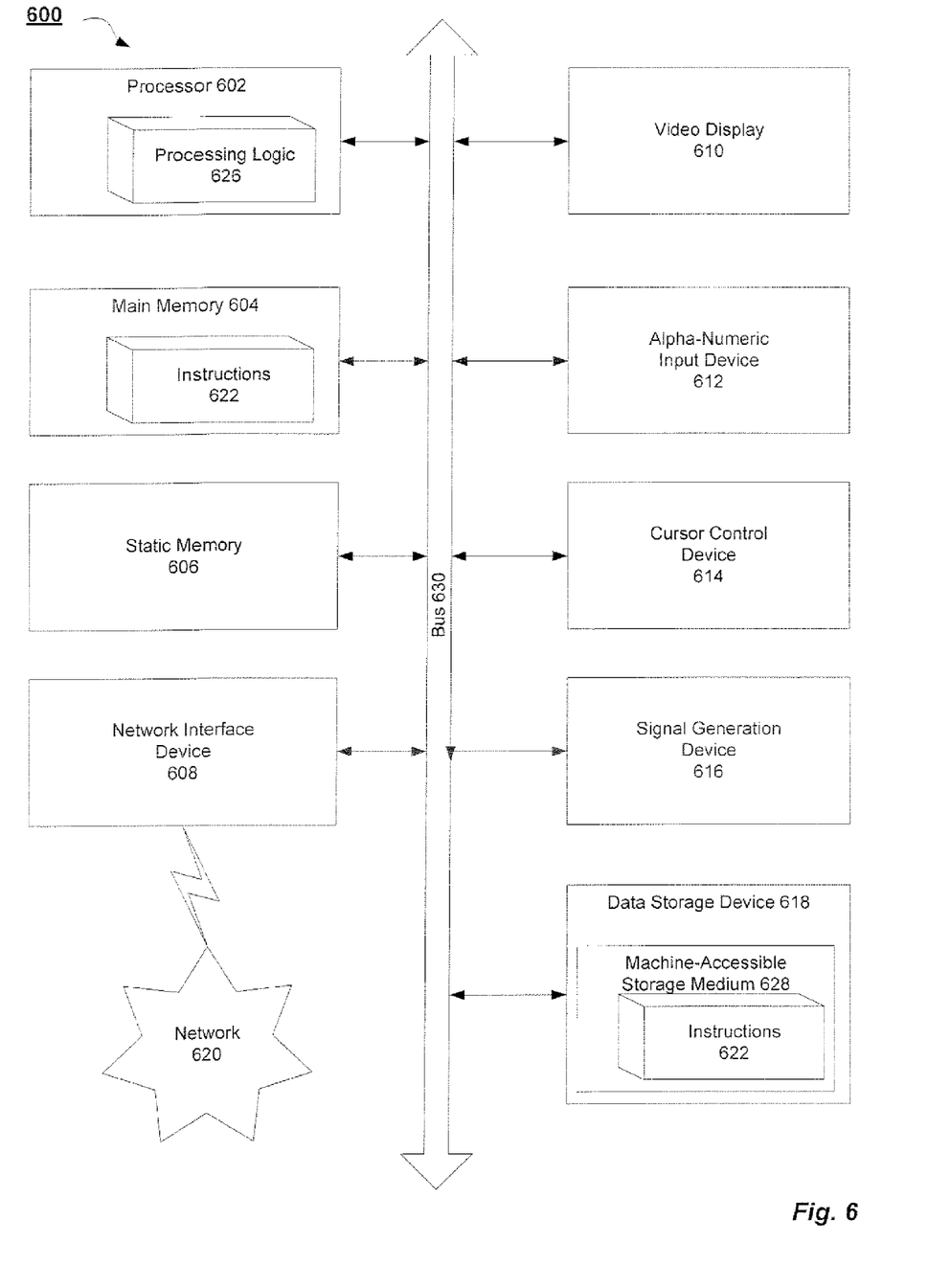
FIG. 6 illustrates a block diagram of one embodiment of a computer system.

FIG. 6 illustrates a diagrammatic representation of a machine in the exemplary form of a computer system 600 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 600 includes a processing device 602, a main memory 604 (e.g., read-only memory (ROM), flash memory, dynamic random access memory (DRAM) (such as synchronous DRAM (SDRAM) or Rambus DRAM (RDRAM), etc.), a static memory 606 (e.g., flash memory, static random access memory (SRAM), etc.), and a data storage device 618, which communicate with each other via a bus 630.

Processing device 602 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute the processing logic 626 for performing the operations and steps discussed herein.

The computer system 600 may further include a network interface device 608. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The data storage device 618 may include a machine-accessible storage medium 628 on which is stored one or more set of instructions (e.g., software 622) embodying any one or more of the methodologies of functions described herein. The software 622 may also reside, completely or at least partially, within the main memory 604 and/or within the processing device 602 during execution thereof by the computer system 600; the main memory 604 and the processing device 602 also constituting machine-accessible storage media. The software 622 may further be transmitted or received over a network 620 via the network interface device 608.

The machine-readable storage medium 628 may also be used to stored instructions to perform methods 400 and 500 to provide virtual logical volume management as described with respect to FIGS. 4 and 5, and/or a software library containing methods that call the above applications. While the machine-accessible storage medium 628 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the present invention. The term "machine-accessible storage medium" shall accordingly be taken to include, but not be limited to, solid-state memories, and optical and magnetic media.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the invention.

What is claimed is:

1. A computer-implemented method, comprising:
   writing, by a virtual machine (VM) host server computing device, a control block to each of a plurality of network-capable physical storage devices;
   mapping, by the VM host server computing device, physical storage blocks of the plurality of network-capable physical storage devices to virtual storage blocks by associating the physical storage blocks with the virtual storage blocks in the control block of the network-capable physical storage device housing the physical storage blocks being mapped; and
   assigning, by the VM host server computing device, a block range of the virtual storage blocks to a VM allocated by the VM host server computing device by writing an identifier (ID) of the VM to the control block in the network-capable physical storage device having the physical storage blocks associated with the virtual storage blocks of the block range that is to be assigned to the VM.

2. The method of claim 1, further comprising identifying the plurality of network-capable storage devices in a network hosting the network-capable storage devices.

3. The method of claim 1, wherein the mapping the physical storage blocks further comprises marking each physical storage block entry in a control block as free for allocation.

4. The method of claim 3, wherein assigning the block range of the virtual storage blocks to the VM further comprises scanning the control blocks of the plurality of network-capable physical storage devices for entries marked as free for allocation.

5. The method of claim 1, further comprising initializing the VM allocated by the VM host server by:
- scanning all control blocks of the plurality of network-capable physical storage devices to identify the unique ID of the VM;
- mapping all identified physical storage blocks associated with the unique ID of the VM to a local device mapper block device of the host VM server; and
- mounting a virtual disk of the local device mapper block device as a block device of the VM, the virtual disk associated with the physical storage blocks assigned to the VM.

6. The method of claim 1, wherein the unique ID of the VM is a 128-byte UUID.

7. The method of claim 1, wherein the VM host server hosts a plurality of VMs that have access to the virtual storage pool.

8. The method of claim 1, wherein the plurality of network-capable physical storage devices are iSCSI compatible devices.

9. A system, comprising:
- a memory;
- a processing device;
- a network interface;
- one or more host virtual disks;
- a virtual machine (VM) executed from the memory to virtualize the processing device and the one or more host virtual disks; and
- a virtual logical volume management (VLVM) module communicably coupled to the network interface and the VM, the VM power agent operable to:
  - write a control block to each of a plurality of network-capable physical storage devices identified via the network interface;
  - map physical storage blocks of the plurality of network-capable physical storage devices to virtual storage blocks of the one or more host virtual disks by associating the physical storage blocks with the virtual storage blocks in the control block of the network-capable physical storage device housing the physical storage blocks being mapped; and
  - assign a block range of the virtual storage blocks to the VM by writing an identifier (ID) of the VM to the control block in the network-capable physical storage device having the physical storage blocks associated with the virtual storage blocks of the block range that is to be assigned to the VM.

10. The system of claim 9, further comprising the VLVM module to identify the plurality of network-capable storage devices in a network hosting the network-capable storage devices.

11. The system of claim 9, wherein the VLVM module to map the physical storage blocks further comprises the VLVM to mark each physical storage block entry in a control block as free for allocation.

12. The system of claim 11, wherein the VLVM module to assign the block range of the virtual storage blocks to the VM further comprises the VLVM module to scan the control blocks of the plurality of network-capable physical storage devices for entries marked as free for allocation.

13. The system of claim 9, further comprising the VLVM module, upon initialization of the VM, to:
- scan all control blocks of the plurality of network-capable physical storage devices to identify the unique ID of the VM;
- map all identified physical storage blocks associated with the unique ID of the VM to a virtual disk of the one or more host virtual disks of the host VM server; and
- mount the virtual disk as a block device of the VM.

14. The system of claim 9, wherein the unique ID of the VM is a 128-byte UUID.

15. The system of claim 9, wherein the plurality of network-capable physical storage devices are iSCSI compatible devices.

16. A non-transitory machine-readable storage medium including data that, when accessed by a machine, cause the machine to perform operations comprising:
- writing, by a virtual machine (VM) host server computing device, a control block to each of a plurality of network-capable physical storage devices;
- mapping, by the VM host server computing device, physical storage blocks of the plurality of network-capable physical storage devices to virtual storage blocks by associating the physical storage blocks with the virtual storage blocks in the control block of the network-capable physical storage device housing the physical storage blocks being mapped; and
- assigning, by the VM host server computing device, a block range of the virtual storage blocks to a VM allocated by the VM host server computing device by writing an identifier (ID) of the VM to the control block in the network-capable physical storage device having the physical storage blocks associated with the virtual storage blocks of the block range that is to be assigned to the VM.

17. The non-transitory machine-readable storage medium of claim 16, wherein the data, when access by the machine, causes the machine to perform operations further comprising identifying the plurality of network-capable storage devices in a network hosting the network-capable storage devices.

18. The non-transitory machine-readable storage medium of claim 16, wherein the mapping the physical storage blocks further comprises marking each physical storage block entry in a control block as free for allocation.

19. The non-transitory machine-readable storage medium of claim 18, wherein assigning the block range of the virtual storage blocks to the VM further comprises scanning the control blocks of the plurality of network-capable physical storage devices for entries marked as free for allocation.

20. The non-transitory machine-readable storage medium of claim 16, wherein the data, when access by the machine, causes the machine to perform operations further comprising initializing the VM allocated by the VM host server by:
- scanning all control blocks of the plurality of network-capable physical storage devices to identify the unique ID of the VM;
- mapping all identified physical storage blocks associated with the unique ID of the VM to a local device mapper block device of the host VM server; and
- mounting a virtual disk of the local device mapper block device as a block device of the VM, the virtual disk associated with the physical storage blocks assigned to the VM.

* * * * *